Jan. 20, 1931.  S. TONIETTI  1,789,610
GAUGING ROD
Filed March 18, 1929
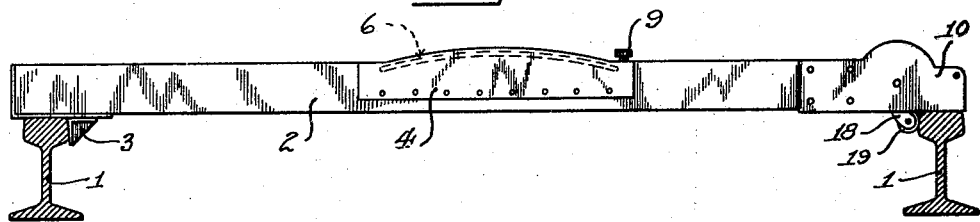
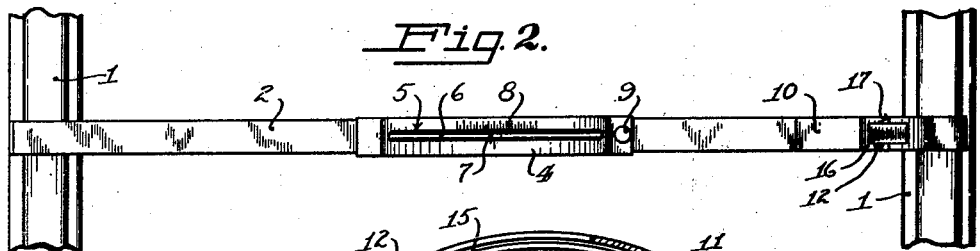
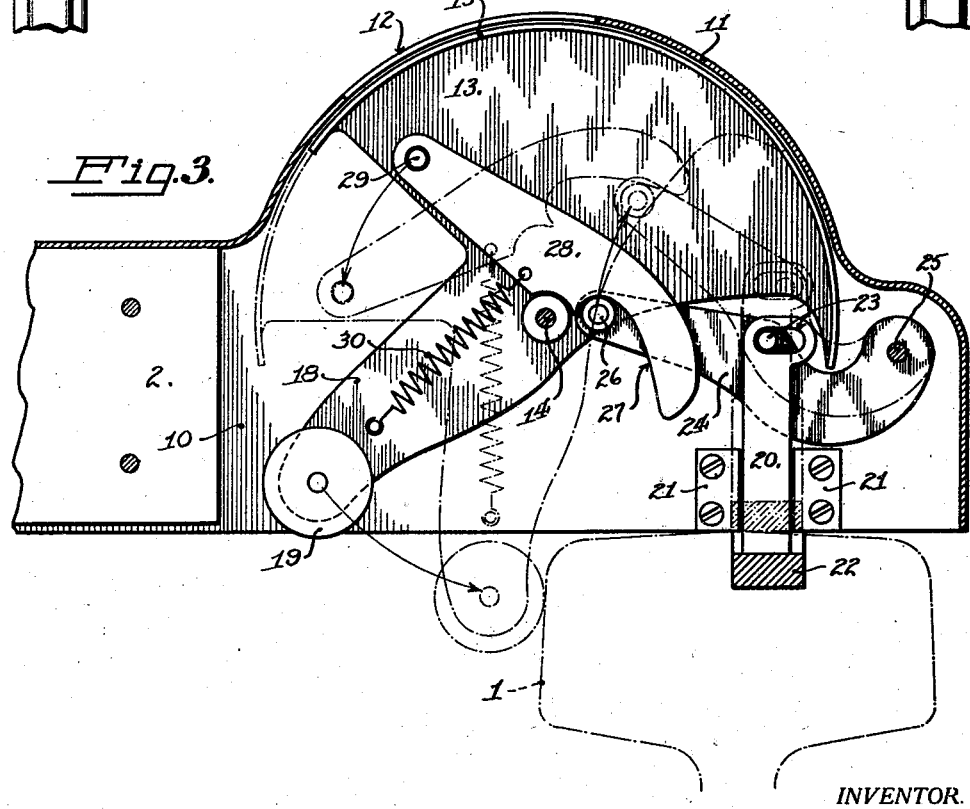
INVENTOR.
Simon Tonietti
BY
Booth & Booth
ATTORNEYS.

Patented Jan. 20, 1931

1,789,610

UNITED STATES PATENT OFFICE

SIMON TONIETTI, OF COUGAR, CALIFORNIA

GAUGING ROD

Application filed March 18, 1929. Serial No. 347,823.

The present invention relates to gauging rods used in the construction and maintenance of railway tracks.

The principal object of the invention is to provide a single instrument for indicating and measuring both the relative elevation of the two rails of the track and also the gauge or distance between said rails. Another object of the invention is to provide an instrument for indicating the desired measurement by the single simple operation of laying it across the two rails of the track without further movement or adjustment. This permits the greatest possible speed in operating the device without any sacrifice of accuracy.

Other objects and advantages of the invention will become apparent from the following description of a preferred form thereof which should be read with the understanding that the form, construction and arrangement of the several parts may be varied within the limits of the claims hereto appended without departing from the spirit of the invention as expressed therein.

In the drawings:—

Fig. 1 is a side elevation of the device in operative position upon the rails of a railway track.

Fig. 2 is a plan thereof.

Fig. 3 is an enlarged vertical section of one end portion of the device showing the gauge measuring mechanism.

Referring in more detail to the drawings, the reference numeral 1 designates the rails of a railway track. The gauging rod embodying the invention comprises a bar 2 adapted to be placed across and to rest upon said rails, as shown in Figs. 1 and 2. At one end the bar 2 has a fixed lug or shoulder 3 projecting from its lower surface and adapted to be placed in contact with the inner face of the head of one rail. The other end of the bar is adapted to rest firmly upon the top of the other rail.

In the central region of the bar 2 is a device for indicating the inclination of the bar, and thereby the relative elevation of the rails. This device preferably comprises a casing 4 having a curved or convex upper surface in which is a longitudinal slot 5. A curved spirit-level tube 6 is mounted beneath the slot 5 with its bubble or other indicating float 7 visible therethrough. The upper face of the casing 4 is preferably provided with a suitable scale 8 properly calibrated to indicate the position of the bubble 7 in terms of the relative elevation of the rails. Any suitable means indicated by the thumb screw 9 may be provided for adjusting the inclination of the level tube 6 relative to the bar 2. At the end opposite the lug 3, the bar is provided with a hollow casing 10 having a semi-cylindrical top 11 in which is an aperture or window 12. A spider 13 is mounted within the casing 10 upon a horizontal pivot 14 centrally located with respect to the semi-cylindrical casing top 11. The upper portion of said spider is segmental and carries a concentric rim 15 positioned immediately within the casing top 11 and visible through the window 12 therein. The outer face of said rim 15 is provided with a suitably calibrated scale 16 adapted to be read in conjunction with an indicating mark 17 upon the casing.

The lower portion of the spider 13 is made in the form of an arm 18 adapted to project through the open bottom of the casing 10 and carrying a roller 19 upon its end, said roller being adapted to contact with the inner face of the head of the rail, as indicated in broken lines in Fig. 3. The weight of the spider 13 is so distributed as to cause it to normally occupy the position shown in full lines in which the arm 18 and roller 19 are withdrawn inside the casing.

A vertical slidable bar 20 is mounted within the casing 10 in suitable guides 21. Its lower end has a foot 22 normally projecting below the bottom of the casing and adapted to contact with the top of the rail-head. The upper end of said slide bar has a pin and slot connection 23 with a swinging lever 24 pivoted at 25 within the casing. The free end of said lever carries a roller 26 adapted to bear against a cam face 27 formed upon an arm 28 secured by a pivot 29 to the spider 13. A spring 30 holds the cam arm 28 normally in the position shown in full lines, in which position it rests against the central pivot 14 of said spider.

When the casing 10 is lowered upon the rail, the slide bar 20 is moved upwardly, to the position indicated in broken lines in Fig. 3, until the bottom of said casing rests upon the rail. The upward movement of the slide bar 20 swings the lever 24 upwardly and this in turn causes the spider 13 to be rotated about its pivot 14 through the action of the roller 26 and the cam face 27 until the roller 19 carried by the arm 18 of said spider contacts with the side of the rail-head. Such contact limits the rotary movement of the spider 13, further movement of the slide bar 20 and the lever 24 being permitted by the movement of the cam arm 28 about its pivot 29 against the tension of the spring 30. The position of the spider 13 as indicated by its scale visible through the window 12 therefore indicates the gauge or distance between the rails of the track.

It is to be noted that the device is operated entirely by the single act of placing it upon the rails. The weight of the bar 2 and the casing 10 is sufficient to press the slide bar 20 upwardly and rotate the spider 13 to bring its roller 19 into contact with the side of the rail and to further retract said slide bar until the bottom of the casing 10 rests firmly upon the top of the rail. In this position, as indicated in Fig. 1, the gauge or distance between the rails is immediately indicated by the scale 16, and at the same time the relative elevation of the rails is indicated by the level 6. Upon raising the bar 2 off the rails, the weight of the upper portion of the spider 13 causes it and the slide bar 20 to return to their normal positions.

By making the device operable independent of any act of the operator other than the mere placing of it in position upon the track, I not only decrease materially the time necessary for making the desired measurements, but I also reduce to a minimum the possibility of error through improper adjustment or positioning of the device.

I claim:—

1. A gauging rod for railway tracks comprising a bar adapted to be placed upon and across the rails of the track in fixed relation to one of said rails; a member carried by the bar and adapted to be moved into contact with the side of the other rail; a second movable member adapted for contact with the top of the second rail; a connection between said members whereby the former is moved by the latter; and means for indicating the position of the first movable member with respect to said bar.

2. A gauging rod for railway tracks comprising a bar adapted to be placed upon and across the rails of the track in fixed relation to one of said rails; a casing carried by said bar and adapted to rest upon the top of the other rail; a movable member mounted in said casing and adapted for contact with the side of said other rail; a second movable member protruding from the casing and adapted for contact with the top of said other rail; a resilient connection between said members whereby the former is moved by the latter; and means for indicating the position of the first movable member with respect to said bar.

3. A gauging rod for railway tracks comprising a bar adapted to be placed upon and across the rails of the track in fixed relation to one of said rails; a casing carried by said bar and adapted to rest upon the top of the other rail; a pivotally mounted member within said casing; gravity operated means for moving said member into contact with said other rail; and means for indicating the position of said pivotal member with respect to said bar.

4. A gauging rod for railway tracks comprising a bar adapted to be placed upon and across the rails of the track in fixed relation to one of said rails; a member carried by the bar and adapted to be moved into contact with the side of the other rail; a second member adapted for contact with the top of said other rail and moved by the weight of the bar to actuate the first member; and means for indicating the position of one of said members with respect to said bar.

5. A gauging rod for railway tracks comprising a bar adapted to be placed upon and across the rails of the track in fixed relation to one of said rails; a member carried by the bar and adapted to be moved into contact with the side of the other rail; a second member adapted for contact with the top of said other rail and moved by the weight of the bar to actuate the first member; a resilient connection between said members; and means for indicating the position of the first member with respect to said bar.

6. A gauging rod for railway tracks comprising a rigid bar adapted to be positioned upon and across the rails of the track with its ends resting upon said rails; a shoulder at one end of said bar adapted for contact with the side of one rail; a member movably mounted at the other end of said bar; means actuated by the weight of said bar upon the other rail for moving said member into contact with the side of said other rail; and means for indicating the position of said member with respect to said bar.

In testimony whereof I have signed my name to this specification.

SIMON TONIETTI.